Feb. 23, 1971 F. J. J. M. STOLLMAN ET AL 3,566,360
CONTROL SYSTEM FOR COORDINATING OPERATION OF A PLURALITY OF ASYNCHRONOUSLY OPERATED PERIPHERAL DATA TRANSMITTING AND RECEIVING DEVICES
Filed April 30, 1968 2 Sheets-Sheet 1

INVENTORS.
THEUNIS BRINKMAN
JAN KRAMMER
FRANCOIS J.J.M. STOLLMAN
by Ronald P. Shipman United States Patent Office 3,566,360

Patented Feb. 23, 1971

3,566,360

CONTROL SYSTEM FOR COORDINATING OPERATION OF A PLURALITY OF ASYNCHRONOUSLY OPERATED PERIPHERAL DATA TRANSMITTING AND RECEIVING DEVICES

Francois J. J. M. Stollman and Jan Krammer, Nijmegen, and Theunis Brinkman, Bemmel, Netherlands, assignors to The Singer Company, a corporation of New Jersey Filed Apr. 30, 1968, Ser. No. 725,471
Int. Cl. G06f 3/00, 9/18
U.S. Cl. 340—172.5 1 Claim

ABSTRACT OF THE DISCLOSURE

A plurality of data receiving and/or transmitting devices such as, for example, an electronic central processor, a magnetic type handler, a paper tape reader/punch, a magnetic disc, and the like, commonly termed peripherals or satellites, each of which may have data receiving or transmitting speeds different from the others, are coupled together through a central or common control means for integrating or controlling communication of the peripherals with each other. Each satellite has associated therewith a line unit or control means for transmitting and receiving control and data signals between the satellite and the common control unit, each line unit being identical to the other line unit.

BACKGROUND, FIELD OF INVENTION

This invention pertains to a communication system for integrating the operation of a plurality of data handling devices with each other and, more particularly, concerns a means for controlling the transmission and receipt of data signals between data handling devices which may have different operating speeds or rates.

BACKGROUND, PRIOR ART

In data handling systems, a plurality of data handling devices or subsystems, commonly termed peripherals or satellites are incorporated. For example, an electronic data processor, which itself may be properly termed a satellite, is in communication or interconnected with other electronic and/or electromechanical satellites such as, for example, an auxiliary data memory of the core type, magnetic disc type, or magnetic tape type, a paper tape punch, a paper tape reader of the mechanical feeler or optical sensing type, a typewriter, a high-speed printer, a printed character reading device, a sorting or collating device, etc., etc.

Interconnection of the data handling satellites should preferably be made in such a manner that a minimal amount of changes to a particular satellite is required to incorporate or integrate the satellite into the total system.

In the past, integration of a plurality of satellites with each oher has been accomplished by the rather awkward means of tying each satellite with each of the other satellites directly. It can be appreciated that this type of integration requires a large unwieldly group of interconnection channels or cables, each of which need associated special controls therefor to match the particular pair of interconnected satellites. With such an integrating system, there is still no coordination, timewise, of data communication between various groups or pairs of satellites.

SUMMARY

The present invention is accomplished in a data handling system providing control units at satellites which serve as a receiver of data and control signals from a central supervisory or common control unit, and which serve as a transmitter for transmitting data and control signals to the common control unit.

Each line control unit is also adapted to transmit received signals to its associated satellite and to receive signals from its associated satellite. Each line control is in parallel with the other satellites and with the common control unit.

Any signals transmitted from the common control unit are received at each of the line control units. However, by means of address identification in the satellites, only one of the satellites will respond to an address signal. It is, therefore, an object of the present invention to provide an improved data handling system.

Another object of the present invention is to provide an improved communication system for a plurality of data handling devices.

Still another object of the present invention is to provide an economical control system for integrating communication between a plurality of data handling devices.

The features of novelty that are considered characteristic of this invention are set forth with particularity in the appended claims. The organization and method of operation of the invention may best be understood from the following description when read in connection with the accompanying drawings.

DESCRIPTION OF AN EMBODIMENT

Figure 1:
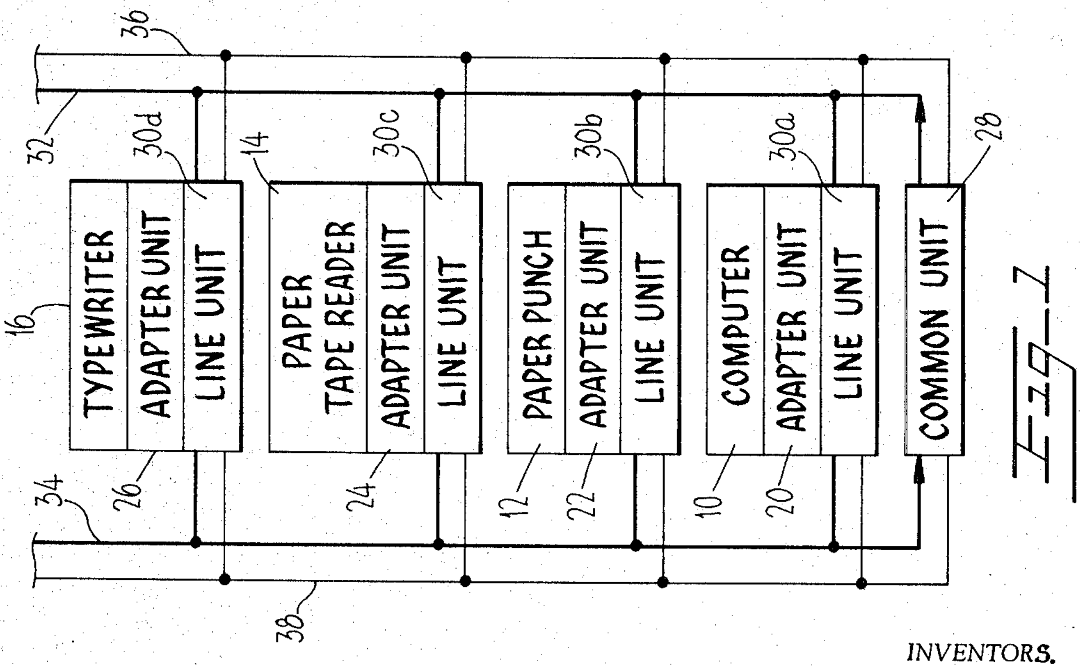
FIG. 1 is a simplified block diagram illustrating the present invention.

In FIG. 1, there is shown, in simplified block diagram form, a data handling or communication system according to the present invention. The communication system is shown as including separate data handling devices or satellites, also termed peripherals, identified in FIG. 1 as a computer 10, a paper tape punch 12, a paper tape reader 14, and a typewriter 16. The present invention is not limited to the use of only four satellites, but may be used with any number and type of satellite as will become more apparent as the description proceeds. The satellites are generally of any type that can receive and/or transmit electrical data and/or control signals.

The transmission and/or receiving rate of the satellites may and most often are different from each other. For example, a power actuated typewriter may be capable of typing at a rate of not greater than twenty characters per second; thus, the receiving rate of the typewriter would be not greater than twenty code words per second. On the other hand, a paper tape punch may be capable of receiving and punching code words at a rate far in excess of the above-mentioned typing rate. Further, it is well recognized in the art to which the present disclosure pertains that an electronic data processor is capable of receiving and transmitting data code words at rates far in excess of the operating rates of input-output peripherals by substantial orders of magnitude.

The number of bits in a data code word that is received from or transmitted to the individual satellites need not be the same. However, in those cases where the number of data code word bits are different between different satellites, it is within the skill of a person skilled in the art to which the present invention pertains to provide a code conversion unit which is able to convert any data code word to a new data code word having a predetermined maximum number of bits. This is required since, as will be explained in more detail below, the present invention receives and transmits data code words over data channels having a fixed or predetermined number of bit lines.

Therefore, for the purpose of completely describing the present invention, there is shown in FIG. 1 data code word adapter units 20, 22, 24, and 26, individual ones of which are associated with individual satellites 10, 12, 14, and 16, respectively. Each adapter unit includes the necessary components including interconnection with its associated satellite to translate or convert the data code word transmitted from the satellite to a new standard or compatible data code word that is utilizable by the present invention. In addition, the adapter unit associated with each satellite converts the standard data code word received from a common control unit 28 to a data code word usable or compatible with the associated satellite's normal internal structure.

In one preferred embodiment of the present invention, the compatible data code word length is eight bits. Thus, all the adapter units convert the data words transmitted from their associated satellite to an eight-bit data word. Also, each adapter unit converts the eight-bit data word code received from common control unit 28 to the usual or normal data word that is usable by its associated satellite.

It should also be mentioned that while the present invention will hereinafter be described as utilizing a multibit data word in which the bits are transmitted in parallel, is within the capabilities of a person skilled in the art to adapt the present invention to use with satellites which normally transmit and receive data words in serial or bit-by-bit fashion. One way of doing this is by incorporating an accumulating register or storage means that accepts serial input and transmits all received bits in parallel fashion, etc.

Additionally, each of the adapter units 20, 22, 24, and 26 will include necessary coding and/or decoding equipment or structure for receiving and transmitting certain control signals such as, for example, a start signal, a stop signal, etc., if such structure is not already a part of the associated satellite.

Each satellite's adapter unit has associated therewith a separate line unit or data and control signal control means 30. Each line unit is identical structurally with all the other line units. Thus, throughout the remainder of this description, only one line unit will be specifically described and shown, it being understood that such description applies equally well to the other line units.

As shown in FIG. 1, a satellite data input channel 32 extends from the common control unit 28 to each of the line units 30; thus, the line units are connected in parallel with each other and the common control unit 28 by means of the data channel 32. Data signals transmitted from the common control unit 28 are received simultaneously at each of the line units 30.

As also shown in FIG. 1, a satellite data output channel 34 extends from each of the line units 30 to the common control unit 28; thus, the line units 30 are connected in parallel with each other and the common control unit. Data signals transmitted from any of the line units 30 are received at the common control unit.

Further, a line unit input control channel 36 extends from the common control unit to each of the line units. In addition, there is a common satellite data transmission status control channel 38 extending from each of the line units to the common control unit.

Further details of the four above-mentioned data and control channels will be set forth hereinafter. Of particular interest is the fact that each satellite's line unit serves as a receiver of data signals from the common control unit, and serves as a transmitter of data signals to the common control unit; thus, each line unit may be termed a transceiver, which term describes the transmitting and receiving ability of the line units.

Figure 2:
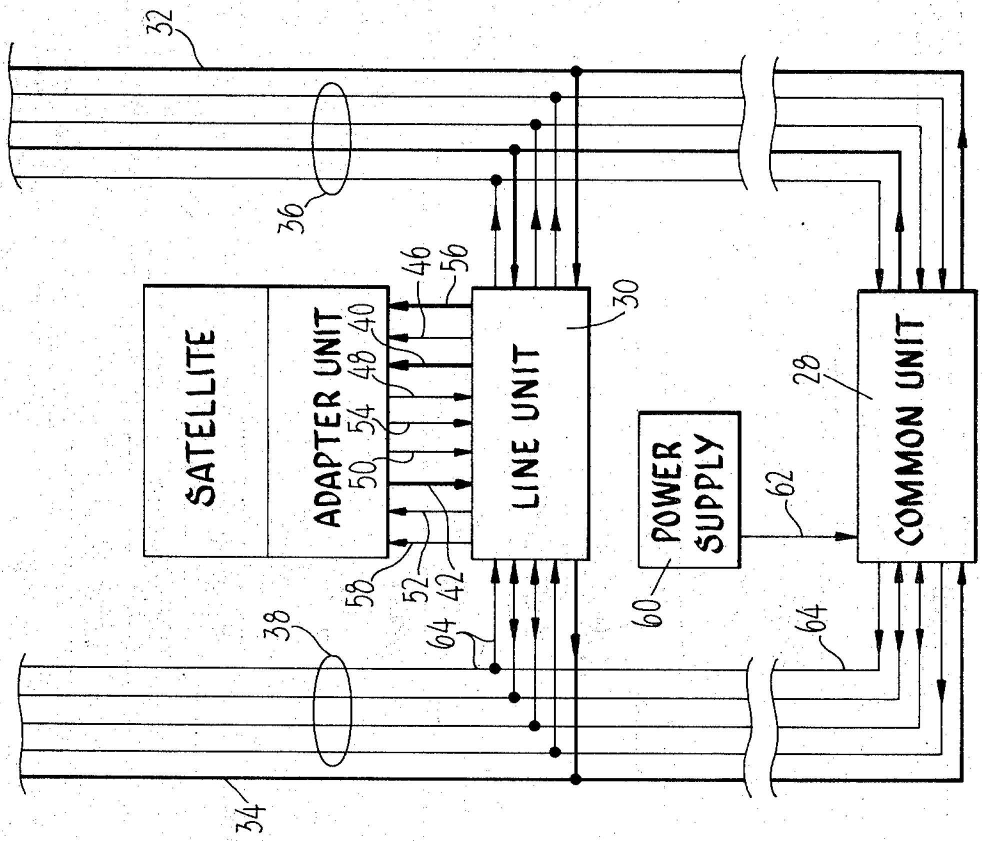
FIG. 2 is a more detailed block diagram illustrating the major signal and control channels of the present invention.

Reference is now made to FIG. 2, wherein there is shown in more detail the individual signal lines included in control channels 36 and 38, plus a plurality of interconnecting signal lines extending between one line unit 30 and its associated adapter unit. Also shown is the data channel 32, which may comprise as many individual data lines as required for the particular situation. For example, data channel 32 may comprise eight separate data lines to handle an eight-bit parallel transmission code. The same is true with satellite data transmission channel 34; i.e., it comprises as many individual data lines as required, for example, eight lines for parallel transmission of an eight-bit data word to the common control unit 28.

Likewise, a data channel 40 having as many individual data lines as required extends from a set of control gates in the line unit to the adapter unit, and a data channel 42 having as many individual data lines as required extends from the adapter unit to a second set of control gates in the line unit 30.

A data receiving control line 46 extends from the line unit to the adapter unit and transmits a true level or binary 1-level signal to the adapter unit whenever any data signals are being transmitted on data channel 40.

When the satellite is receiving a set of data signals via data channel 40, it is frequently necessary that such data signals be received for a predetermined minimum length of time, i.e., the data signals must be present for a sufficiently long time. When, or after, the data signals on data channel 40 have been received for a sufficiently long time, a true or binary 1-level signal is transmitted from the adapter unit to its associated line unit 30 via a sufficiently received line 48. Further, the signal on line 48 is changed to binary 0-level when the associated satellite is in condition to receive another set of data signals.

Thus, when the signal on line 48 is in the 0-level condition, the signal on line 46 may change to 1-level. New data is thus transmitted to the satellite. Then after a period of time, the signal on line 48 changes to 1-level, indicating that the data signals have been received for a sufficiently long period of time. In response to the change in signal level on line 48 from 0-level to 1-level, the signal on line 46 will change from 1-level to 0-level, thereby indicating that no more data signals are transmitted to the satellite.

In like manner, a transmission control line 50 extends from the adapter unit to the line unit and transmits a 1-level signal to the line unit whenever any data signals are being transmitted on data channel 42.

The signals on lines 46 and 50 may be termed status indicating signals, and such signals are generally necessary since the time delays in the individual lines comprising data channels 40 and 42 may not be absolutely identical.

It is necessary that data signals transmitted from the adapter unit be transmitted for a predetermined or sufficiently long time. Therefore, a signal control line 52 extending from the line unit to the adapter unit transmits a 1-level signal after the data has been transmitted on data channel 42 for a sufficiently long time. Further, the signal on line 52 is changed to a 0-level signal when the line unit is in condition to receive further data signals. Thus, when the signal on line 50 is in the 0-level condition, the signal on line 52 may change to 1-level; new data is thus transmitted to the line unit. Then after a period of time, the signal on line 52 changes to 1-level indicating that data has been received for a sufficiently long period of time. In response to the change in signal level on line 52 from 0-level to 1-level, the signal on line 50 will change from 1-level to 0-level, thereby indicating that no more data signals are transmitted to the line unit.

Each satellite includes address and command recognizing circuits. A data word indicative of a start command to a particular satellite is transmitted to all of the line units from the common control unit 28 via data channel 32.

Each of the line units will transmit such start command data word to their associated adapter units via their data channels 40. Also, as such start command data word is transmitted, each control line 46 will be transmitting a 1-level signal. Only one of the satellites will recognize the data word as addressed to itself and thus respond to the start command.

If the thus addressed and turned on satellite wants to transmit a data word, the signal on sufficiently received line 48 is not changed to 1-level; it remains at 0-level. Instead, a 1-level signal is transmitted on a start-stop line 54 from the adapting unit to the associated line unit. The 1-level signal on start-stop line 54 causes the signal on control line 46 to change to 0-level.

The signal on start-stop line 54 must be in the 0-condition (stop-receiving) for the line unit to ask for transmission of a data word from the satellite; a transmission request is indicated by a 0-level signal on control line 52.

A satellite may control switchover of itself from its transmitting mode of operation to its receiving mode of operation. Basically this is accomplished as follows.

Recalling that when the satellite and its line unit is in the transmitting mode of operation, the signal on control line 50 is changed from 1-level to 0-level each time new data is to be transmitted. Now if the satellite is to change its mode of operation to that of receiving, the signal on line 50 is maintained at 0-level and the signal on line 54 is changed to 1-level. This will occur if the signal on line 52 is 0-level (a new data code word is requested). The 1-level signal on line 54 is maintained until the control line 52 signal is changed to 1-level (no new data is requested). The signal on line 54 is then changed to 0-level in order that a new data word may be received by the satellite.

Further, a satellite may be switched to its transmitting mode of operation automatically if such satellite was in the transmitting mode just prior to operation of the last-operated satellite in the transmitting mode, which either stops transmitting without first transmitting an address/start code for a new satellite or transmits a stop-transmitting code. When either of such events or conditions occur, the signal on control line 46 associated with that satellite which is to resume its transmitting mode of operation, changes to 0-level, and the associated line unit does not transmit new data on data channel 40, to the satellite, but instead requests new data from the satellite by changing the signal on line 52 to 0-level.

A satellite can be switched from its transmitting mode of operation to its receiving mode of operation by transmitting a stop-transmitting code, or, in response to received information, another satellite indicates that it is to become a transmitting satellite. The transmitting satellite that is to be switched is done so by a 1-level signal on line 46 indicative of data being transmitted, and a 1-level signal being maintained on line 52 (the signal on line 52 does not change to 0-level, thus there is no indication to the satellite that new data is requested of that satellite).

A special line or channel 56 is provided from the line unit 30 to the associated adapter unit for transmission of a set of special control signals; each special control signal serves to set up the control conditions for executing one of three special routines or programs, or, as is termed herein, fixation conditions. The first two fixation conditions termed fixation condition A and fixation condition B, respectively, allow the transmission of a variable number of data words from a satellite, while the third fixation condition, termed fixation condition C, allows the transmission of a fixed or predetermined number of data words from a satellite.

During the execution or performance of a fixation condition by a satellite, a change in the task assigned to such satellite cannot be made until such task is wholly completed or is enabled to make the change as described below.

A change in the task assigned to a receiving satellite by a fixation condition may take place if at the time that the signal on line 46 is 0-level, the signal on line 48 is also 0-level.

Likewise, a change in the task assigned to a transmitting satellite by a fixation condition may take place if at the time the signal on line 54 is 0-level, the signal on line 52 is 1-level.

As shown in FIG. 2, a special power on control line 58 extends from the line unit to the satellite's adapter unit; the ultimate source of the control line 58 is any suitable electric power supply unit 60 which furnishes electric power directly to the common control unit 28 via line 62, from where power is then distributed to each of the line units by way of line 64.

When the power supply 60 is turned on, a 1-level signal is transmitted on line 58 and all logic elements of the system are placed in an enabled or ready state. Further, the 1-level signal on each of the control lines 58 places each associated satellite in a condition wherein each satellite can receive data and/or control signals.

Then, in order to render the system operative, one of the satellites is manually or otherwise operated so as to cause it to change from a receiving mode of operation to a transmitting mode of operation. For example, manually operating a control button on a perforated tape reader will cause the reader to start reading the tape and transmit the data so read over the data transmission channel 34 to the common control unit 28.

Figure 3:
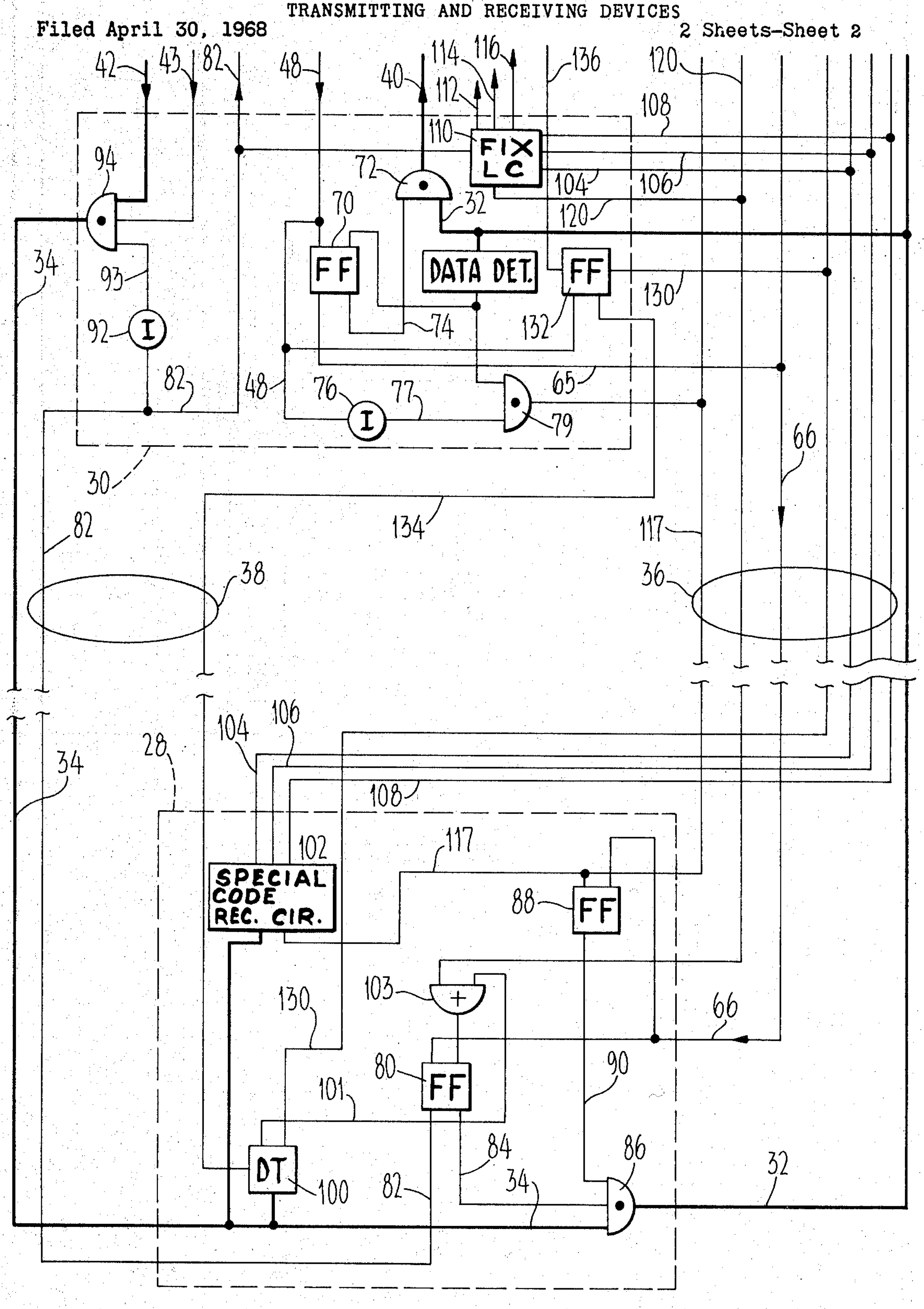
FIG. 3 is a simplified logic diagram illustrating the control system of the present invention.

Reference is now made to FIG. 3 wherein more complete details of a line unit 30 and the common control unit 28 are shown.

If a data word has been received via data channel 40 by the particular satellite for a sufficiently long time, a 1-level signal is transmitted on to a memory or storage means 70 in the associated line unit; such storage means may be, for example, a flip-flop which is placed in its set state by the 1-level signal on line 48. Further, receipt of the 1-level signal on line 48 also disables further transmission of data on channel 40 to the associated satellite. This disabling action is demonstrated logically in FIG. 3 by means of an AND-gate 72, an input of which is logically shown as data channel 32 and the other input of which is a lead 74 which transmits a 0-level signal from the memory means 70 in response to the 1-level signal on line 48. It will be recognized by those skilled in the art to which the present invention pertains that the AND-gate 72 and its output channel 40 is merely representative of the necessary plurality of logic gates and associated input and output leads that will be required to control and transmit a multi-bit data word in parallel.

There is also shown in FIG. 3 an inverter 76 having as its input line 48 and having as its output a line 77. It will be understood that when a 1-level signal is present on line 48, there will be transmitted from the inverter 76 a 0-level signal on lead 77 to an AND-gate 79. Conversely, when the signal on line 48 is 0-level, there will be transmited on line 77 a 1-level signal to AND-gate 79.

The memory element 70 in a line unit records or stores the fact that a 1-level signal has been transmitted on the associated line 48. Even though the 1-level signal on line 48 may change to 0-level during a cycle of operation (by the satellite indicating that it is ready to receive another data word), the memory element will continue to record the fact that the line 48 had transmitted a 1-level signal.

An output line 65 of each memory element 70 in each of the line units 30 are electrically tied together, thereby forming a control or sufficiently received line 66.

When all of memory elements 70 of all the line units in the system record the fact that a 1-level signal has been received on associated lines 48, a 1-level signal will be transmitted on control line 66 to the common control unit 28.

The 1-level signal on line 66 is received by common control unit storage means or logic controls 80 and 88. Each of the logic control means may include, for example, a flip-flop whose state is changed by the received 1-level signal.

The logic control 80 responds to the 1-level signal on line 66 by transmitting a 1-level signal on an output line 82 and a 0-level signal on an output line 84.

The 1-level signal on line 82 is sent to each of the line units 30 to place them in a ready-to-transmit condition. The 0-level signal on lead 84 disables transmission of data by an AND-gate 86, which gate is like AND-gate 72 in that the plurality of data signals applied thereto from the line unit is indicated by data channel 34, while the plurality of output data signal lines is indicated by data channel 32.

The logic control 88 responds to the 1-level signal on line 66 by transmitting a 1-level enabling signal on lead 90 to the AND-gate 86; however, the previously mentioned 0-level signal on lead 84 prevents transmission of data signals through AND-gate 86 at this time.

The 1-level signal on line 82 is received, in each line unit 30, by an associated inverter 92. The inverter 92 thus transmits a 0-level disabling signal to an associated data transmission control AND-gate 94. The AND-gate 94 is like previously mentioned AND-gate 72 and 86 in that a plurality of input data lines from an associated satellite are indicated by data channel 42, while a plurality of output data lines are indicated by data channel 34. Thus, when a 0-level signal is transmitted to AND-gate 94 from inverter 92, no data signals are transmitted on data channel 34 to the common control unit 28.

Further, the 1-level signal on line 82 is furnished to the associated satellite.

A data signal detector unit 100 in the common control unit 28 responds to the absence of data signals on signal channel 34 by transmitting a 1-level signal via a lead 101 to an OR-gate 103 which then transmits a 1-level signal to the logic control means 80. The logic control means 80 responds to the 1-level signal from OR-gate 103 by changing the signal on line 82 to 0-level changing the signal on lead 84 to 1-level. AND-gate 86 in the common control unit 28 is thus now fully enabled to transmit any data signals received on data signal channel 34 to data signal channel 32.

Now, since the signal on line 82 to inverter 92 is 0-level, the signal on lead 93 to AND-gate 94 is 1-level. However, the previously mentioned 0-level signal on line 82, which is transmitted to the associated satellite, has caused cessation of data signal transmission via data channel 42 to the AND-gate 94. In addition, the associated satellite responds to the 1-level signal on line 82 by transmitting a 0-level signal to the associated AND-gate 94 via line 43. Thus, even though the signal on lead 93 returns or is changed to 1-level, as described above, the AND-gate 94 remains disabled until the 0-level signal on line 43 is changed to 1-level and data signals are present on data channel 42.

Now, when a satellite is ready to transmit a new set of data signals to the common control unit 28, the signal on line 43 is changed to 1-level and data signals are present on data channel 42; since the AND-gate 94 in the associated line unit is thus completely enabled (it is to be recalled that the signal on lead 93 is 1-level at this time), data signals will thus be transmitted on data channel 34 to the AND-gate 86 of the common control unit.

Now, assuming that the signal on line 90 from the logic control 88 of the common control unit is 1-level to the AND-gate 86, the data signals on data channel 34 are transmitted through AND-gate 86 and thence onto data channel 32 to each of the line units 30.

The operation of the system of the present invention in the fixation modes will now be described. The fixation modes are used to transmit information, including function codes or commands, such as, for example, codes which normally effect an action ("ON," "OFF," "TYPE," "PRINT," etc.), without, however, the actions being performed. An illustration of such a fixation mode of data transfer would be where a typewriter (satellite) is utilized to transfer or transmit data codes to a paper tape punch for the purpose of preparing a master program tape, to be read later by a paper tape reader in actually carrying out the program.

The fixation condition mode codes are recognized by a special code recognition logic circuit 102 in the common control unit 28. As shown in FIG. 3, the data channel 34 is fed into the special logic circuit 102 which responds to the special codes when present on the data channel 34 by storing the codes therein until cancelled and by transmitting a 1-level signal on one of three output leads 104, 106, or 108.

Cancellation of the first two fixation condition modes is accomplished by a special cancellation code, while cancellation of the third fixation condition mode is automatic.

The signals on the lines 104, 106, and 108 are transmitted to each of the line units where a fixation condition logic control unit 110 responds, if such line unit was addressed, and causes the appropriate action to take place. For example, if a fixation condition A 1-level signal on line 104 is transmitted to that line unit 30 shown in FIG. 3, the logic control 110 transmits a 1-level signal to the associated satellite via a line 112 for appropriate action. Likewise, if a fixation condition B 1-level signal is sent to the line unit 30 via line 106, the logic control 110 transmits a 1-level control signal to the satellite via a line 114. A fixation condition C indicated by a 1-level signal on line 108 causes the logic control 110 in the line unit to transmit a 1-level signal on line 116 to the associated satellite for appropriate control purposes.

As shown in FIG. 3, the data channel 34 is connected to the fixation condition logic control 102; thus the logic control 102 can recognize all fixation codes transmitted on data channel 34. Likewise, the logic control 102 recognizes a change in fixation conditions.

The logic control 102 can effect a change in output fixation condition signals (lines 104, 106, or 108) in response to a new fixation code on signal channel 34 only when the signal on line 117 (ready-to-receive) is 1-level.

A code on the data channel 34 giving rise to a change in fixation conditions is transmitted through the common control unit's AND-gate 86 in the usual manner as with other data signals.

A line unit (and its associated satellite) can respond to a change in fixation condition signals on lines 104, 106, or 108 only when the signal on line 98 (feedback transmitting channel) is 1-level.

Only when all fixation condition logic control units 110 perceive a change in fixation conditions will a 1-level "understood" signal be transmitted on line 120 to OR-gate 103 which, in turn, transmits a 1-level signal to the logic control 80, thereby causing the logic control to transmit a 0-level signal on line 82. It will be recalled that a 0-level signal on line 82 opens transmission gates 94 in each of the line units.

It should be noted that when the line units respond to a change in fixation condition by transmitting an "understood" signal on line 120, they do not transmit a 1-level signal on line 117.

As soon as the signal on line 82 is changed to 0-level, the logic controls 110 in each of the line units 30 respond by changing the signal on the "understood" line 120 to 0-level and the signal on line 117 is changed to 1-level.

It will be recognized that a change in signal level on line 90 to 1-level will effect transmission of a new set of data signals through AND-gate 86.

There will now be described control operations to effect replacement of any one of the satellites as a transmitter or receiver with another satellite as a transmitter or receiver.

If the common control unit 30 receives a stop code on data channel 34, the data detector 100 recognizes such code and transmits a 1-level signal on a line 130 and transmits such signal to a logic control 132 in each line unit 20. The logic controls 132 respond to such 1-level input signal by making its associated line unit an active transmitter if it was previously a passive transmitter (neither a receiver nor transmitter) or by making such line unit a passive transmitter if it was previously an active transmitter.

When the satellites are thus switched from being an active transmitter to being a passive transmitter or vice versa, their logic controls 132 transmit a 1-level feedback signal to the common control unit via a line 134 and cause the signal on line 130 to be changed back to 0-level.

If a satellite, while operating as a passive transmitter or as an active receiver wants to become an active transmitter, as by manual control, for example, there is transmitted from the satellite, on a line 136, a 1-level signal, to the associated line unit 28 instead of transmitting a 1-level signal on line 48. The signal on line 136 is applied to the logic control 132 which memorizes the fact that its associated satellite is now an active transmitter and also causes a 1-level signal to be transmitted on line 130.

Thus, the satellite that was previously an active transmitter now becomes passive, and the previously passive satellite now becomes a receiving satellite.

A satellite operating as an active transmitter can become a receiver as commanded by, for example, manual control by transmitting a 1-level signal on line 136 rather than transmitting a 1-level signal on line 43. In response to such signals, all the other line units now switch over from their active transmitting mode of operation to the passive mode of operation.

What is claimed is:

1. A system for integrating the operation of a plurality of data handling devices, wherein each of said devices are capable of transmitting and receiving data and control signals, said system comprising:

a plurality of signal transmitting and receiving means, individual ones of said transmitting and receiving means being associated with and connected directly to individual ones of said devices;

a common signal control means;

a first set of signal transmission means interconnecting said common signal control means with each of said signal transmitting and receiving means in parallel;

a second set of signal transmission means interconnecting said common control means with each of said signal transmitting and receiving means in parallel;

individual ones of said signal transmitting and receiving means including means for transmitting a first control signal to said common control means when data signals are transmitted on said first set of signal transmission means from said one transmitting and receiving means to said common control means;

said common control means including means for transmitting a second control signal on said second set of signal transmission means to each of said signal transmitting and receiving means in response to said first control signal, each of said signal transmitting and receiving means including means for receiving data signals transmitted on said second set of signal transmission means in response to said second control signal, and for inhibiting transmission of data signals on said first set of signal transmission means to said common control means from the other ones of said signal transmitting and receiving means;

each of said signal transmitting and receiving means including means for inhibiting further receipt of signals on said second set of signal transmission means and for transmitting signals on said first set of signal transmission means to said common control means in response to data and control signals received from said common control means on said second set of signal transmission means;

each of said signal transmitting and receiving means including means for effecting response as a transmitting unit for that signal transmitting and receiving means which was operating as a transmitting unit immediately prior to that signal transmitting and receiving means which is inhibited as a transmitter unit in response to signals received on said second set of signal transmission means which inhibit further transmission of signals therefrom without effecting response of a particular one of said signal transmitting and receiving means as a transmitting unit; and means for memorizing the sequence in which said signal transmitting and receiving means are operated as transmitting units.

References Cited

UNITED STATES PATENTS

| | | | |
|---|---|---|---|
| 3,237,164 | 2/1966 | Evans | 340—172.5X |
| 3,242,467 | 3/1966 | Lamy | 340—172.5 |
| 3,408,632 | 10/1968 | Hauck | 340—172.5 |
| 3,470,542 | 9/1969 | Trantanella | 340—172.5X |

GARETH D. SHAW, Primary Examiner

S. CHIRLIN, Assistant Examiner